(12) United States Patent
Tomes et al.

(10) Patent No.: US 11,165,888 B1
(45) Date of Patent: Nov. 2, 2021

(54) IMAGE ACQUISITION DEVICE VIRTUALIZATION FOR REMOTE COMPUTING

(71) Applicant: Citrix Systems, Inc., Fort Lauderdale, FL (US)

(72) Inventors: Erica Tomes, Pompano Beach, FL (US); Jayadev Marulappa Niranjanmurthy, Parkland, FL (US); Georgy Momchilov, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/862,078

(22) Filed: Apr. 29, 2020

(51) Int. Cl.
| | |
|---|---|
| G06F 9/54 | (2006.01) |
| G06T 1/00 | (2006.01) |
| H04L 29/06 | (2006.01) |
| H04L 29/08 | (2006.01) |
| G06F 9/451 | (2018.01) |
| G06T 1/60 | (2006.01) |

(52) U.S. Cl.
CPC .............. *H04L 67/40* (2013.01); *G06F 9/452* (2018.02); *G06F 9/547* (2013.01); *G06T 1/0007* (2013.01); *G06T 1/60* (2013.01); *H04L 67/02* (2013.01)

(58) Field of Classification Search
CPC ......... H04L 67/40; H04L 67/02; G06F 9/452; G06F 9/547; G06F 9/541; G06T 1/0007; G06T 1/60
See application file for complete search history.

(56) References Cited

U.S. PATENT DOCUMENTS

| 8,994,967 | B1 * | 3/2015 | Mayers ................... H04L 63/00 |
| | | | 358/1.13 |
| 9,467,458 | B2 * | 10/2016 | Patesaria ................ H04L 63/104 |
| 9,892,074 | B2 | 2/2018 | Vajravel |
| 2006/0085516 | A1 * | 4/2006 | Farr ..................... H04L 65/4038 |
| | | | 709/217 |
| 2010/0315686 | A1 * | 12/2010 | Hong ................... H04N 1/0097 |
| | | | 358/442 |
| 2018/0234517 | A1 * | 8/2018 | Venkatesh ........... H04L 67/2814 |
| 2019/0238405 | A1 * | 8/2019 | Karivaradaswamy .. G06F 13/10 |
| 2020/0053084 | A1 | 2/2020 | Vajravel et al. |
| 2021/0176368 | A1 * | 6/2021 | Gill ..................... H04N 1/00973 |

OTHER PUBLICATIONS

Jul. 30, 2021—WO International Search Report—PCT/US21/29645 pp. 1-56.

* cited by examiner

*Primary Examiner* — Brian W Wathen
(74) *Attorney, Agent, or Firm* — Banner & Witcoff, Ltd.

(57) ABSTRACT

Methods and systems for image acquisition device virtualization are described herein. A user of a client computing device may access a remote operating system running on a host computing device via a client application running on a local operating system of the client computing device. An image acquisition device such as a scanner may be connected to the client computing device and the user may wish to use the image acquisition device to acquire image data (e.g., scan a photograph). In order for an image application (e.g., a photo editor) running on the remote operating system to read in the image data from the image acquisition devices, the remote operating system of the host computing device may intercept a service call from the image application at a service layer and redirect the service call, via a virtual channel, to the local operating system of the client computing device.

20 Claims, 11 Drawing Sheets

IMAGE ACQUISITION DEVICE VIRTUALIZATION FOR REMOTE COMPUTING

FIELD

Aspects described herein generally relate to computer networking, remote computer access, virtualization, and hardware and software related thereto. More specifically, the disclosure relates to virtualizing an image acquisition device for remote computing by intercepting, redirecting, and replaying service calls.

BACKGROUND

Virtualization and remote computing offers greater freedom of access to applications and data by allowing users to have access from anywhere in the world as long as they have a suitable client device and network access. For example, one may use a wide variety of personal devices (e.g., a personal computer, a smartphone, a tablet, etc.) to work from home and still be able to access every enterprise application and data both securely and reliably as if they were actually sitting at the desk of their office. However, in order to use an image acquisition device, such as a scanner, that is plugged into the home computer via, for example, a Universal Serial Bus (USB) interface to scan in a document into an image application (e.g., a photo viewer) that is running on a remote virtual operating system, conventional solutions may intercept and redirect signals at the USB level. Remoting the device at this level may be unduly slow and inefficient due to the large amount of overhead data traffic pertaining to the USB protocol itself that needs to be exchanged between the local and remote computing devices. The large number of transactions between the USB bus and functional drivers may adversely affect performance and the resulting latency may render this remoting solution impractical and costly to deploy in real life.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards intercepting and redirecting signals and data at the service layer. For example, the interception/redirection may take place at a Windows Image Acquisition (WIA) service layer of the WINDOWS operating system developed by Microsoft Corporation of Redmond, Wash.

In an illustrative method, an object (e.g., a virtual object) may be created at an image acquisition service layer (e.g., WIA service layer) of a remote operating system associated with a host computing device. The object may mimic or impersonate one or more functionalities of an image acquisition service layer object that is native to the remote operating system. The created object may receive, from an image application running on the remote operating system, a service call such as a WIA application programming interface (API) call. The service call may be received via a software component interface proxy. The service call may include a request for enumerating one or more image acquisition devices associated with the client computing device, reading or writing a device property associated with the image acquisition devices, acquiring image data via the image acquisition devices, and/or transferring the image data. The image acquisition devices may include a scanner, a camera, a fax machine, an imaging device, a memory card reader, image storage, a photo library, and/or a storage medium.

The object may then send the service call to a client application that is running on a local operating system of a client computing device. The client application may be client agent software that enables the client computing device to access a virtual remote desktop environment offered by the remote operating system.

The object may be a component object model (COM) object. The object may further receive data from the client application in response to the service call, and send the data to the image application. The data may be stored in a local cache of the remote operating system. The object may be a virtual device manager object, and the image acquisition service layer object may be a native device manager object of the host computing device.

A hook (e.g., a dynamic link library (DLL) file) may be installed in the remote operating system. The hook may intercept a request, which is sent by the image application, for an instance of the image acquisition service layer object, and send an indication of the object to the image application. The request may include a requested interface identifier, and the requested interface identifier may be compared with a known interface identifier of the image acquisition service layer object of the remote operating system in order to verify that the intercepted request is a correct one.

A virtual channel between the object and the client application may be established over a network. The service call and/or the data may be sent via the virtual channel.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards image acquisition device virtualization for remote computing. A virtual object created in an image acquisition service layer of a remote operating system may intercept a service call from an image application and redirect the call to a local operating system of a client computing device. Client agent software running on the local operating system may receive the service call and replay it at the local operating system by calling local service calls to access one or more image acquisition devices plugged into the client computing device. Any response (e.g., image data) may be likewise redirected by the client agent software to the virtual object in the image acquisition service layer of the remote operating system and then back to the image application. As a result, a user accessing the image application via the client agent software may utilize the image acquisition device seamlessly and transparently with low latency.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting, coupling, and the like.

Computing Architecture

Figure 1:
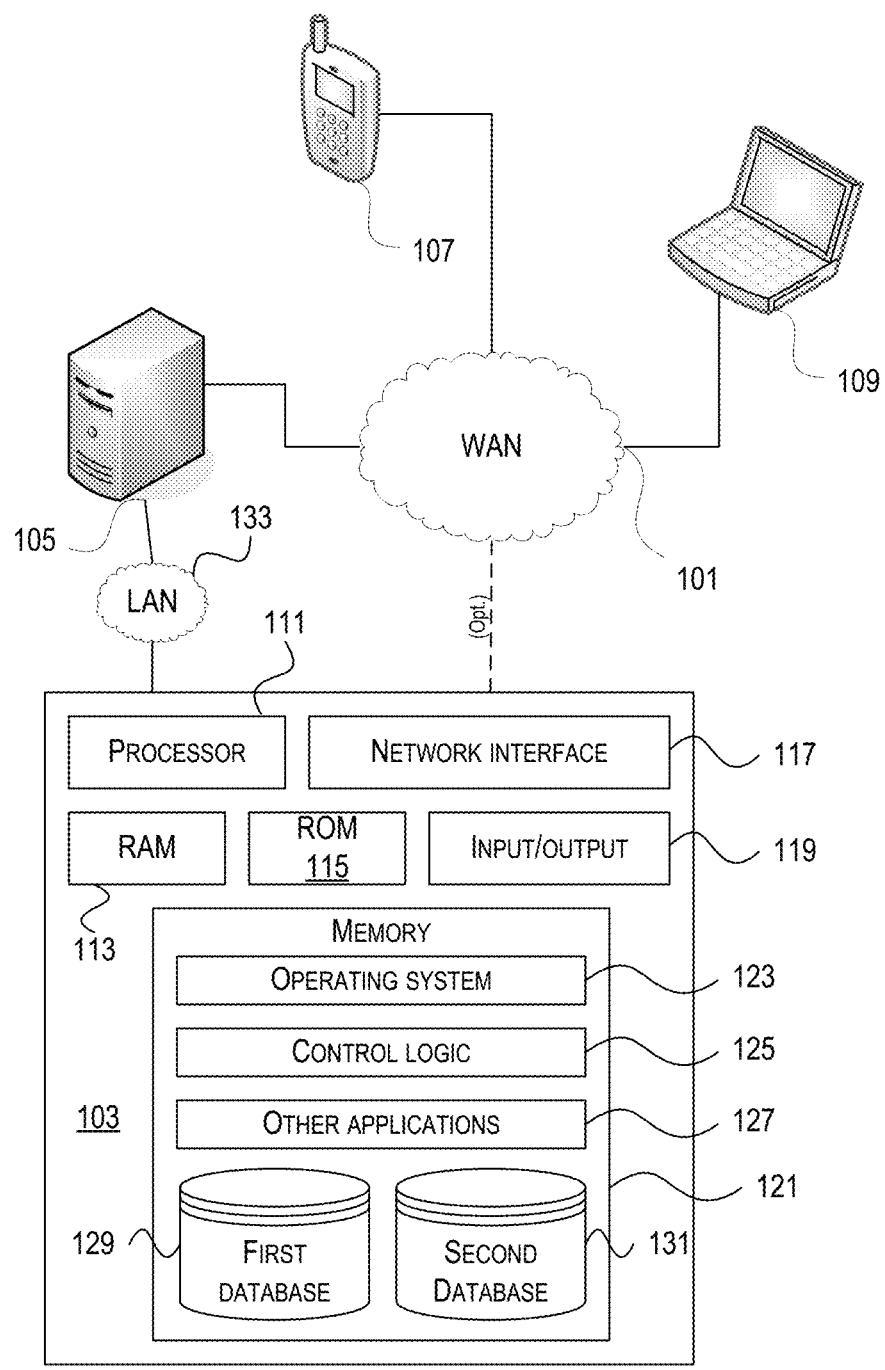
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
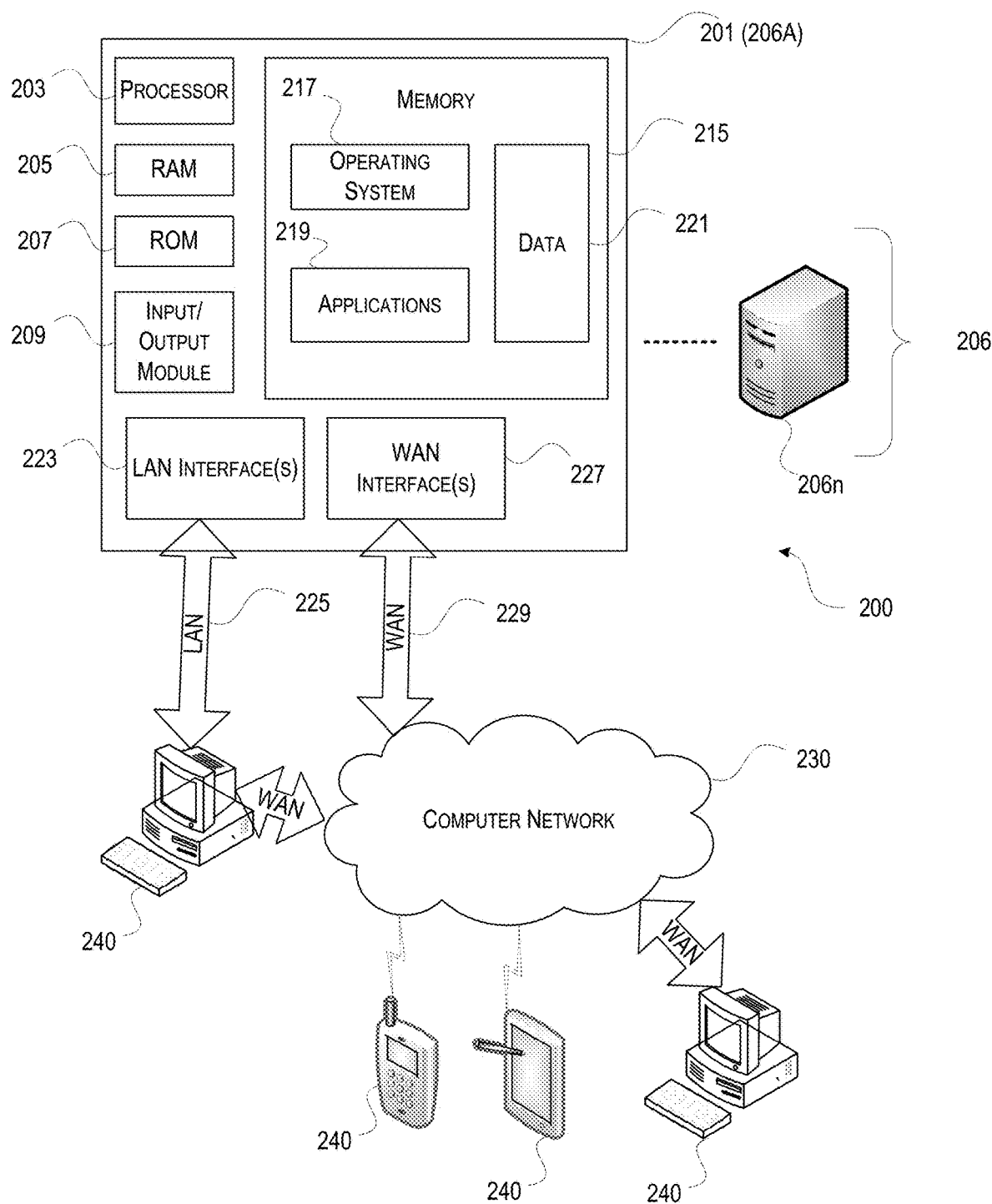
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, MACOS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
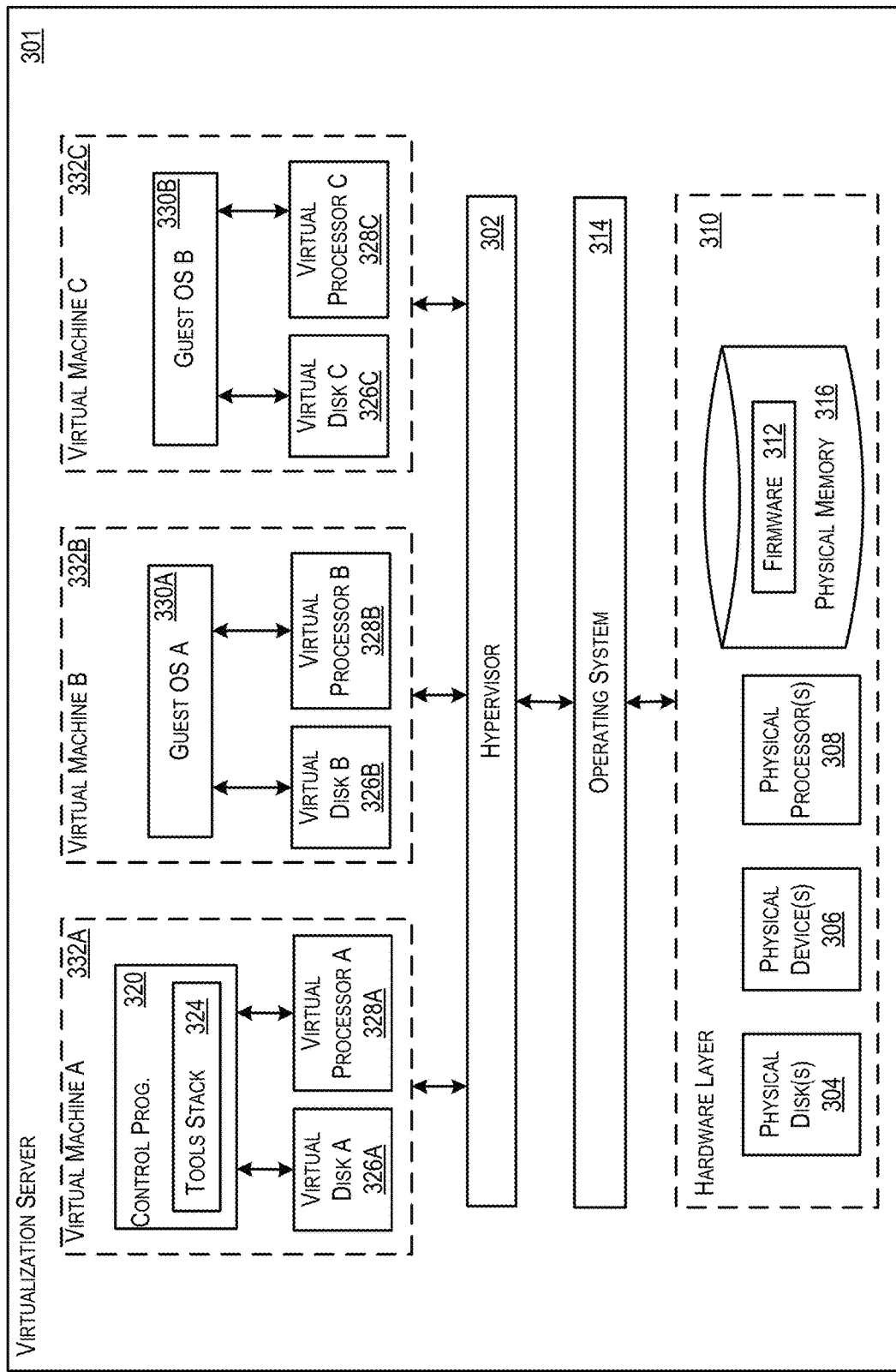
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
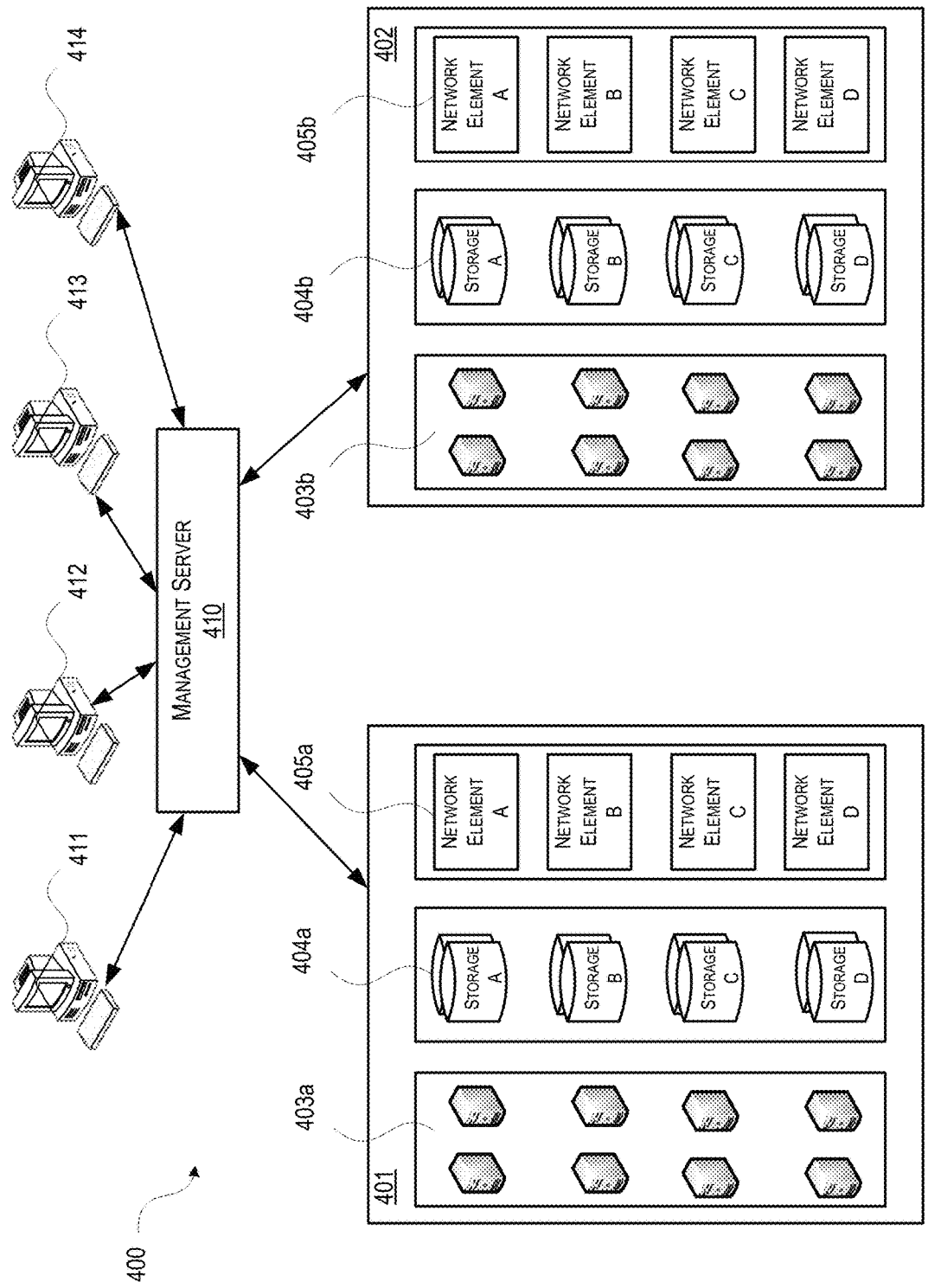
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond, Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
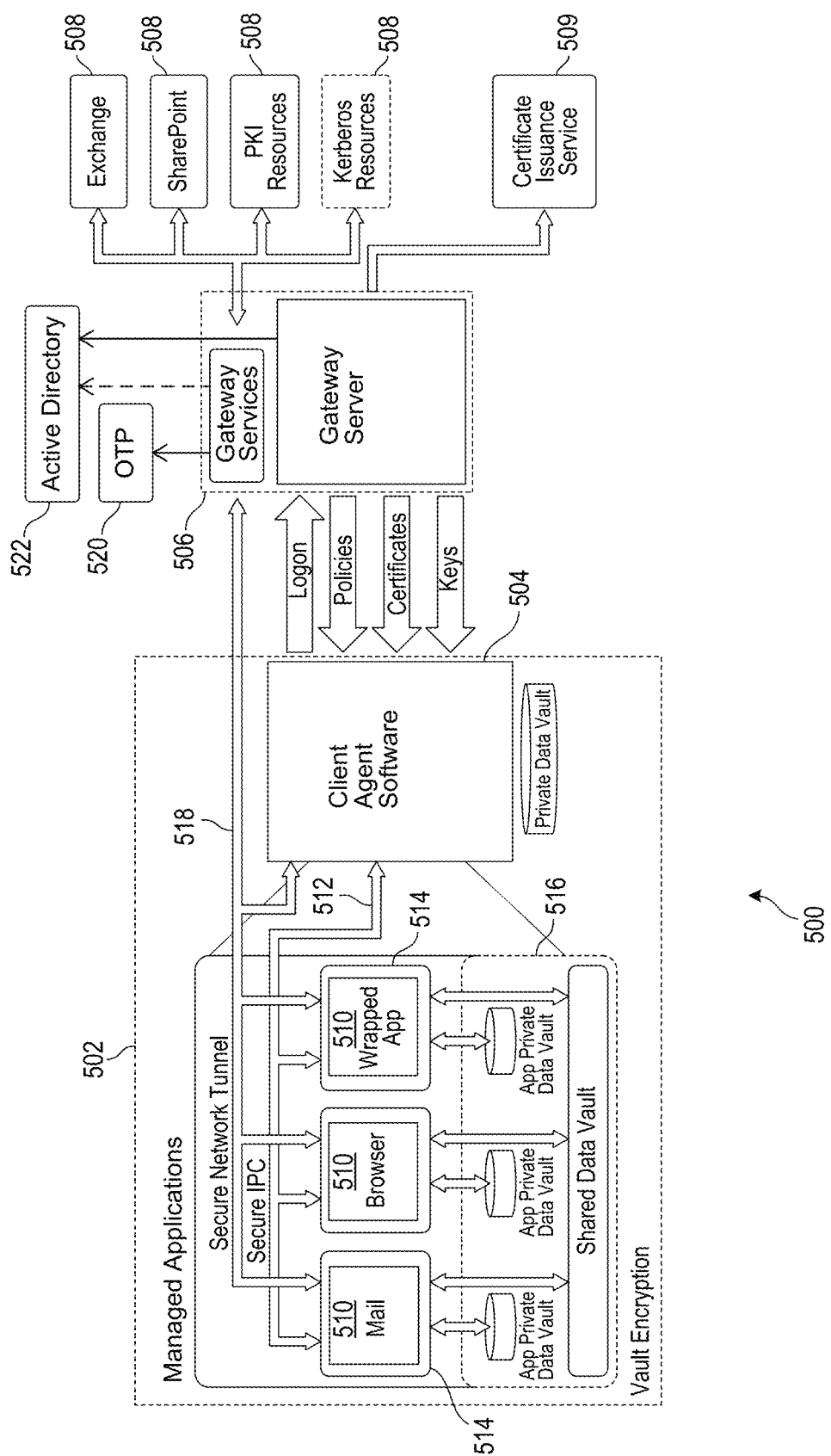
FIG. 5 depicts another illustrative enterprise mobility management system.

FIG. 5 is another illustrative enterprise mobility management system 500. In this case, the left hand side represents an enrolled mobile device 502 with a client agent 504, which interacts with gateway server 506 (which includes Access Gateway and application controller functionality) to access various enterprise resources 508 and services 609 such as Exchange, Sharepoint, public-key infrastructure (PKI) Resources, Kerberos Resources, Certificate Issuance service, as shown on the right hand side above. Although not specifically shown, the mobile device 502 may also interact with an enterprise application store (StoreFront) for the selection and downloading of applications.

The client agent 504 acts as the UI (user interface) intermediary for Windows apps/desktops hosted in an Enterprise data center, which are accessed using the High-Definition User Experience (HDX)/ICA display remoting protocol. The client agent 504 also supports the installation and management of native applications on the mobile device 502, such as native iOS or Android applications. For example, the managed applications 510 (mail, browser, wrapped application) shown in the figure above are all native applications that execute locally on the mobile device 502. Client agent 504 and application management framework of this architecture act to provide policy driven management capabilities and features such as connectivity and SSO (single sign on) to enterprise resources/services 508.

The client agent 504 handles primary user authentication to the enterprise, normally to Access Gateway (AG) 506 with SSO to other gateway server components. The client agent 504 obtains policies from gateway server 506 to control the behavior of the managed applications 510 on the mobile device 502.

The Secure InterProcess Communication (IPC) links 512 between the native applications 510 and client agent 504 represent a management channel, which may allow a client agent to supply policies to be enforced by the application management framework 514 "wrapping" each application. The IPC channel 512 may also allow client agent 504 to supply credential and authentication information that enables connectivity and SSO to enterprise resources 508. Finally, the IPC channel 512 may allow the application management framework 514 to invoke user interface functions implemented by client agent 504, such as online and offline authentication.

Communications between the client agent 504 and gateway server 506 are essentially an extension of the management channel from the application management framework 514 wrapping each native managed application 510. The application management framework 514 may request policy information from client agent 504, which in turn may request it from gateway server 506. The application management framework 514 may request authentication, and client agent 504 may log into the gateway services part of gateway server 506 (for example, Citrix Gateway). Client agent 504 may also call supporting services on gateway server 506, which may produce input material to derive encryption keys for the local data vaults 516, or may provide client certificates which may enable direct authentication to PKI protected resources, as more fully explained below.

In more detail, the application management framework 514 "wraps" each managed application 510. This may be incorporated via an explicit build step, or via a post-build processing step. The application management framework 514 may "pair" with client agent 504 on first launch of an application 510 to initialize the Secure IPC channel 512 and obtain the policy for that application. The application management framework 514 may enforce relevant portions of the policy that apply locally, such as the client agent login dependencies and some of the containment policies that restrict how local OS services may be used, or how they may interact with the managed application 510.

The application management framework 514 may use services provided by client agent 504 over the Secure IPC channel 512 to facilitate authentication and internal network access. Key management for the private and shared data vaults 516 (containers) may be also managed by appropriate interactions between the managed applications 510 and client agent 504. Vaults 516 may be available only after online authentication, or may be made available after offline authentication if allowed by policy. First use of vaults 516 may require online authentication, and offline access may be limited to at most the policy refresh period before online authentication is again required.

Network access to internal resources may occur directly from individual managed applications 510 through Access Gateway 506. The application management framework 514 may be responsible for orchestrating the network access on behalf of each managed application 510. Client agent 504 may facilitate these network connections by providing suitable time limited secondary credentials obtained following online authentication. Multiple modes of network connection may be used, such as reverse web proxy connections and end-to-end VPN-style tunnels 518.

The Mail and Browser managed applications 510 have special status and may make use of facilities that might not be generally available to arbitrary wrapped applications. For example, the Mail application 510 may use a special background network access mechanism that allows it to access an Exchange server 508 over an extended period of time without requiring a full AG logon. The Browser application 510 may use multiple private data vaults 516 to segregate different kinds of data.

This architecture may support the incorporation of various other security features. For example, gateway server 506 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 506 may identify managed native applications 510 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 516 (containers) on the mobile device 502. The vaults 516 may be encrypted so that all on-device data including files, databases, and configurations are protected. For on-line vaults, the keys may be stored on the server (gateway server 506), and for off-line vaults, a local copy of the keys may be protected by a user password or biometric validation. If or when data is stored locally on the mobile device 502 in the secure container 516, it may be preferred that a minimum of AES 256 encryption algorithm be utilized.

Other secure container features may also be implemented. For example, a logging feature may be included, wherein security events happening inside a managed application 510 may be logged and reported to the backend. Data wiping may be supported, such as if or when the managed application 510 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 502 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 514 may be prevented in other ways. For example, if or when a managed application 510 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 520 without the use of an AD (active directory) 522 password for access to one or more applications. In some cases, some users do not know (or are not permitted to know) their AD password, so these users may authenticate using an OTP 520 such as by using a hardware OTP system like SecurID (OTPs may be provided by different vendors also, such as Entrust or Gemalto). In some cases, after a user authenticates with a user ID, a text may be sent to the user with an OTP 520. In some cases, this may be implemented only for online use, with a prompt being a single field.

An offline password may be implemented for offline authentication for those managed applications 510 for which offline use is permitted via enterprise policy. For example, an enterprise may want StoreFront to be accessed in this manner In this case, the client agent 504 may require the user to set a custom offline password and the AD password is not used. Gateway server 506 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 510 as secondary credentials (for the purpose of accessing PM protected web resources via the application management framework micro VPN feature). For example, a managed application 510 may utilize such a certificate. In this case, certificate-based authentication using ActiveSync protocol may be supported, wherein a certificate from the client agent 504 may be retrieved by gateway server 506 and used in a keychain. Each managed application 510 may have one associated client certificate, identified by a label that is defined in gateway server 506.

Gateway server 506 may interact with an enterprise special purpose web service to support the issuance of client certificates to allow relevant managed applications to authenticate to internal PKI protected resources.

The client agent 504 and the application management framework 514 may be enhanced to support obtaining and using client certificates for authentication to internal PM protected network resources. More than one certificate may be supported, such as to match various levels of security and/or separation requirements. The certificates may be used by the Mail and Browser managed applications 510, and ultimately by arbitrary wrapped applications 510 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 510 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 502 is authenticated to the enterprise, and vice versa. Virtual smart cards for authentication to gateway server 506 may also be implemented.

Another feature may relate to application container locking and wiping, which may automatically occur upon jailbreak or rooting detections, and occur as a pushed command from administration console, and may include a remote wipe functionality even when a managed application 510 is not running.

A multi-site architecture or configuration of enterprise application store and an application controller may be supported that allows users to be serviced from one of several different locations in case of failure.

In some cases, managed applications 510 may be allowed to access a certificate and private key via an API (for example, OpenSSL). Trusted managed applications 510 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Image Acquisition Device Virtualization

Figure 6:
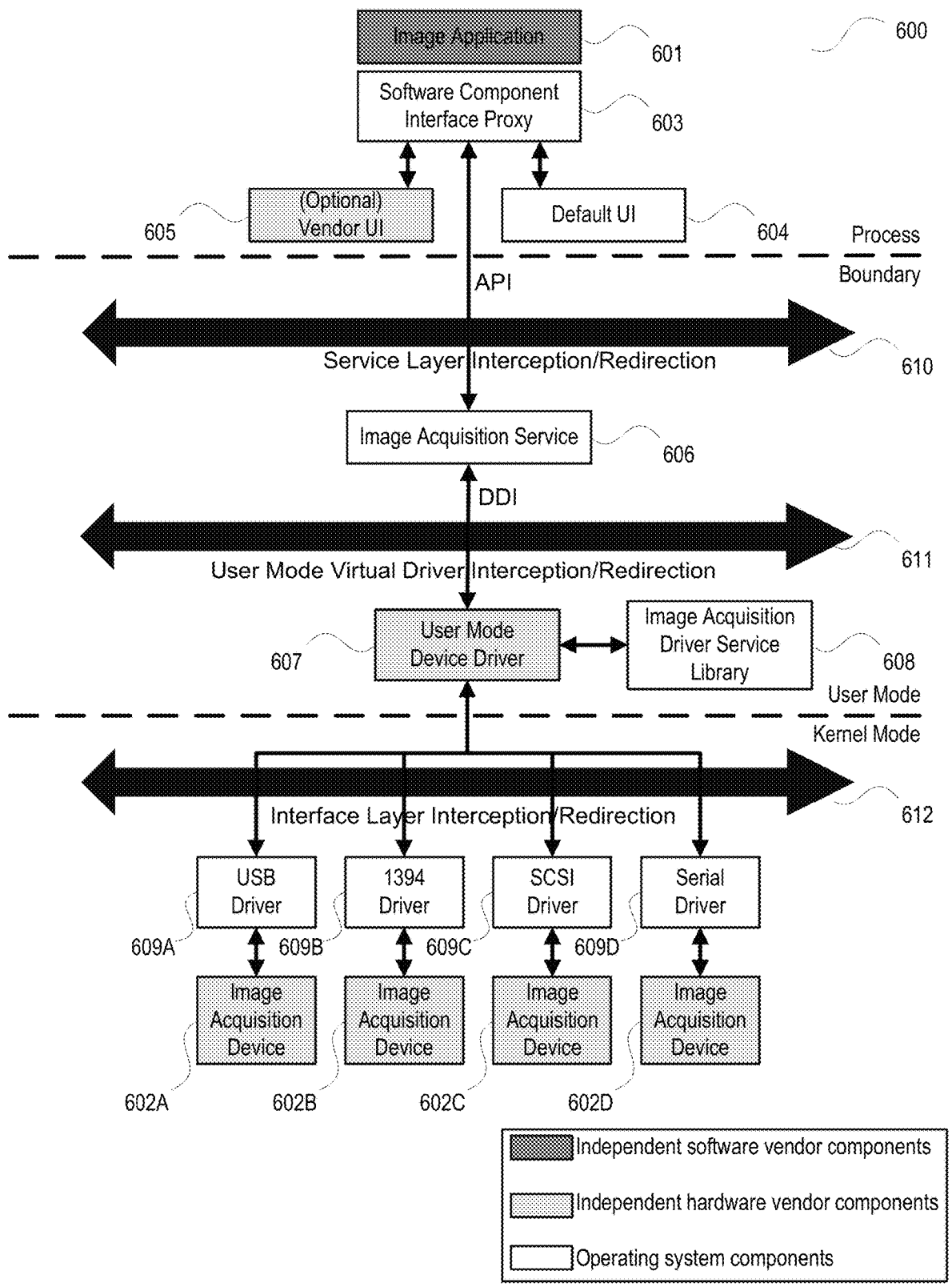
FIG. 6 depicts an illustrative image acquisition device stack and ways to intercept and redirect image acquisition service calls.

FIG. 6 depicts an illustrative image acquisition device stack and ways to intercept and redirect image acquisition service calls. Image acquisition device stack 600 may include image application 601 running on an operating system. The operating system may be a WINDOWS, MACOS, UNIX, LINUX, iOS, ANDROID, or other operating system. Image application 601 may be one of a photo viewer (e.g., PHOTOS developed by Apple Inc. of Cupertino, Calif.), a graphics editor (e.g., ADOBE PHOTOSHOP developed by Adobe Inc. of San Jose, Calif.), a word processor (e.g., MICROSOFT WORD developed by Microsoft Corporation of Redmond, Wash.), fax software, an email client (e.g., MICROSOFT OUTLOOK developed by Microsoft Corporation of Redmond, Wash.), a web browser (e.g., GOOGLE CHROME developed by Google LLC of Mountain View, Calif.), etc. that may acquire image data from one or more of image acquisition devices 602A, 602B, 602C, 602C (collectively 602). Image acquisition devices 602 may be, for example, a scanner, a camera, a fax machine, an imaging device (e.g., a medical imaging device), a memory card reader, a storage medium, image storage, a photo library, etc. For example, a user may scan a photo through a Universal Serial Bus (USB) scanner such as image acquisition device 602A and read the image data into image application 601 such as ADOBE PHOTOSHOP. Image acquisition device stack 600 may be, for example, the Windows Image Acquisition (WIA) driver model and application programming interface (API) for MICROSOFT WINDOWS. WIA device functionality is contained within the WIA service on many WINDOWS operating systems.

Image application 601 may interface with other components in image acquisition device stack 600 via software component interface proxy 603. Software component interface proxy 603 may be a proxy using a specific software component interface. A proxy may reside in the address space of a calling process (e.g., image application 601) and act as a surrogate for a remote object (e.g., an image acquisition service object). The software component interface may be a binary-interface standard such as Component Object Model (COM) developed by Microsoft Corporation of Redmond, Wash. Software component interface proxy 603 may be, for example, a COM proxy associated with image application 601.

A user may interact with image application 601 via default user interface (UI) 604 provided by the operating system. Additionally or alternatively, an independent hardware vendor that manufactured image acquisition device 602 may provide vendor UI 605 that may be used in lieu of default UI 604 that came packaged with the operating system. For example, when the user presses the "Scan" button on a scanner, default UI 604 or vendor UI 605 may be launched depending on how the user set up their UI preference.

Image application 601 may send a service call (e.g., an API call) to image acquisition service 606 of the operating system. For example, image acquisition service 606 may be a WIA service of a WINDOWS operating system. The service call may be for acquiring an image from image acquisition device 602, checking the status (e.g., online, offline, standby, suspended, out of order, etc.) of image acquisition device 602, reading device properties (e.g., image resolution, color palette, image size, image dimension, image format, image zoom level, image crop mode, default imaging application, etc.) from image acquisition device 602, writing device properties to image acquisition device 602, etc. Image acquisition service 606 may operate via, for example, the COM model. Image acquisition service 606 may operate via a COM object, with which image application 601 and/or software component interface proxy 603 communicate.

Image acquisition service 606 may be executed by a processor (e.g., a central processing unit (CPU)) in user mode. Image acquisition service 606 may communicate with user mode device driver 607 via, for example, device driver interface (DDI). User mode device driver 607 may be provided by an independent hardware vendor such as the manufacturer of image acquisition device 602. User mode device driver 607 may be a vendor user mode driver (USD). For example, user mode device driver 607 may be a WIA minidriver built according to the User-Mode Driver Framework (UMDF), which is a device-driver development platform of MICROSOFT WINDOWS. User mode device driver 607 may communicate with image acquisition driver service library 608 provided by the operating system in order to call for assistance in performing various tasks such as building and maintaining an item tree, logging error and trace messages, reading and storing an item's properties, updating and transferring data, etc. Image acquisition driver service library 608 may be, for example, a WIA driver services library.

User mode device driver 607 may communicate with one or more kernel mode device drivers 609A, 609B, 609C, 609C, 609D (collectively 609). Although FIG. 6 illustrates example image acquisition device stack 600 as having USB driver 609A, 1394 driver 609B, Small Computer System Interface (SCSI) driver 609C, and serial driver 609D, image acquisition device stack 600 may have fewer or more kernel mode device drivers than the four example device drivers illustrated in FIG. 6. Each of kernel mode device drivers 609 may be connected to and communicate with one or more image acquisition devices 602. Image acquisition device 602 may be a WIA device such as a scanner, a camera, a fax machine, an imaging device, a memory card reader, a storage medium, image storage, a photo library, etc. Image acquisition devices 602 may be provided by independent hardware vendors.

In a remote computing environment, such as computing environment 200 of FIG. 2, a desktop virtualization system of FIG. 3, a cloud computing environment 400, an enterprise mobility management system 500 of FIG. 5, and the like, image application 601 may be running on a first operating system that is different from a second operating system that image acquisition devices 602 are operating with. For example, a user may be using a client computer, such as one of client computers 411-414 as illustrated in FIG. 4, and remotely accessing a virtual desktop of a remote operating system (also referred to as a host operating system, e.g., an instance of WINDOWS) hosted on one of virtualization servers 403 as illustrated in FIG. 4. The remote operating system may be, for example, one of guest operating systems 330 executing on virtual machines 332 as illustrated in FIG. 3. Thus, image application 601 may be, for example, a virtual application running on the remote operating system and the user may access image application 601 via a client agent software (e.g., client agent software 504 of FIG. 5) that is running on the local operating system (also referred to as a client operating system, e.g., another instance of WINDOWS) of the client device. On the other hand, image acquisition device 602A (e.g., a scanner, a camera, a fax, etc.) may be physically connected to the user's client computer and its local operating system. In order for the user to send an image (e.g., a scanned photograph) acquired by image acquisition device 602A that is connected to the local operating system to image application 601 running on the remote operating system, a command from image application 601 needs to be redirected to the local operating system and, conversely, any image data being sent by image acquisition device 602A needs to be redirected to the remote operating system.

Such signal interception and/or redirection may take place at different levels in image acquisition device stack 600. For example, service layer interception/redirection 610 may intercept and/or redirect signals between software component interface proxy 603 and image acquisition service 606. As another example, virtual user mode driver interception/redirection 611 may intercept and/or redirect signals between image acquisition service 606 and user mode device driver 607. As yet another example, interface-level (e.g., USB) interception/redirection 612 may intercept and/or redirect signals between user mode device driver 607 and kernel mode device driver 609. For each method, signals may be intercepted at a given level in one operating system (e.g., a remote operating system), redirected to the same level in another operating system (e.g., a local operating system), and then replayed. For example, for service layer interception/redirection 610, image application 601 running on the remote operating system of a host (e.g., a virtualization server) may send, via software component interface proxy 603 on the remote operating system, a signal (e.g., an API call) that is destined for image acquisition service 606 of the remote operating system. However, the signal may be intercepted before it reaches image acquisition service 606 of the remote operating system and redirected to the local operating system on the client device. Once the signal is redirected to the local operating system, it may be "replayed" there, that is, the signal may be sent to image acquisition service 606 of the local operating system as if the signal had originated from within the local operating system (e.g., from an application running on the local operating system). The local operating system may then send one or more signals from image acquisition service 606, via its own user mode device driver 607 and kernel mode device driver 609A, all the way down to image acquisition device 602A. In return, image acquisition 602A may send image data through kernel mode device driver 609A, user mode device driver 607, and back to image acquisition service 606 of the local operating system. The data may then be intercepted again from image acquisition service 606 of the local operating system and redirected to the remote operating system, where the data is replayed at the service layer back to software component interface proxy 603 of the remote operating system and ultimately reaches image application 601 running on the remote operating system.

Figure 7:
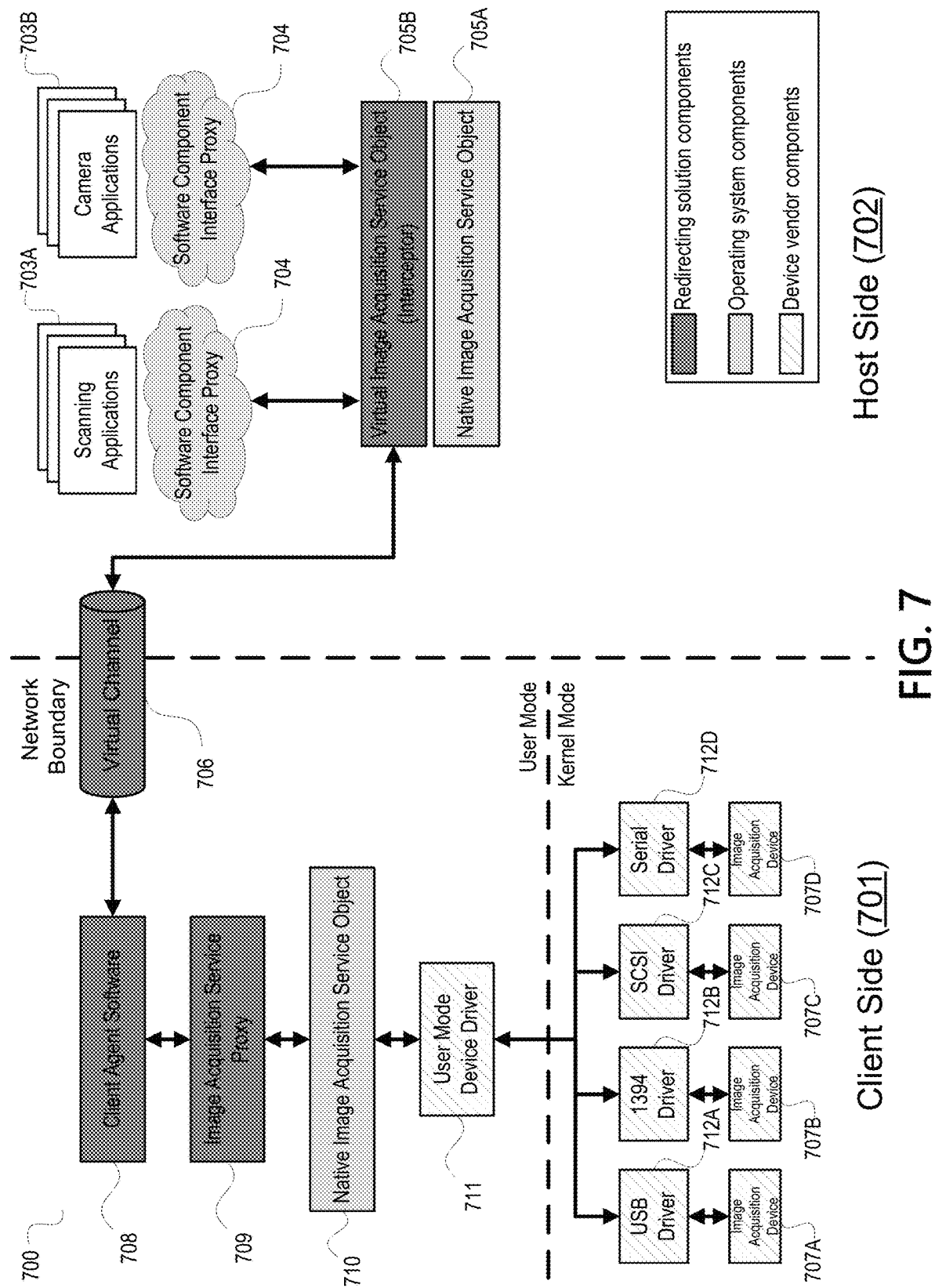
FIG. 7 depicts an illustrative image acquisition interception and redirection model at a service layer.

FIG. 7 depicts an illustrative image acquisition interception and redirection model at a service layer. Illustrative service layer interception and redirection model 700 may be similar to service layer interception/redirection 610 illustrated above with reference to FIG. 6. The components illustrated in FIG. 7 may be substantially similar to the respective corresponding components illustrated in FIG. 6 unless noted otherwise. Service layer interception and redirection model 700 may be divided into client side 701 and host side 702. Client side 701 may include a client computer running a local operating system. The client computer may be a desktop PC, a laptop PC, a mobile phone, a tablet, a wearable computing device, and the like. The local operating system may be WINDOWS, MACOS, LINUX, UNIX, iOS, ANDROID, and the like. Host side 702 may similarly include a host computer running a remote operating system. The host computer may be a desktop PC, a laptop PC, a mobile phone, a tablet, a wearable computing device, and the like, as well as a server such as a virtualization server. The remote operating system may be WINDOWS, MACOS, LINUX, UNIX, iOS, ANDROID, and the like, and the remote operating system may be a different instance than the one that is running on client side 701. The remote operating system may be the same or different operating system platform as the local operating system. The remote operating system may be running on a virtual machine (e.g., as a guest OS) that is running on a hypervisor. Client side 701 and host side 702 may be physically located at remote locations (e.g., different rooms, different buildings, different regions, different continents, etc.) from each other although they can be located in proximity to each other. Client side 701 and host side 702 may be communicatively connected with other via a network (e.g., the Internet). One or more secure network tunnels may be established between client side 701 and host side 702 for secure and reliable communication.

On host side 702, one or more applications, such as scanning applications 703A and camera applications 703B (collectively 703), may be running on a remote operating system. Applications 703 may be a photo viewer, a graphics editor, a word processor, fax software, an email client, a web browser, and the like. Applications 703 may use software component interface proxy 704 to send a signal (e.g., a WIA API call) to a service layer of the remote operating system. Software component interface proxy 704 may be a COM proxy of the WINDOWS operating system platform. The service layer may be a WIA service layer. The WIA API may comprise approximately 15 class interfaces which are used for device functionality. Through a software component interface (e.g., COM), applications 703 may request interface objects and then perform various tasks such as enumerating image acquisition devices, reading/writing device properties, acquiring image data (e.g., scanning), transferring image data, and the like. Application 703 may send a signal to the service layer of the remote operating system to retrieve an image acquisition service object such as an image acquisition device manager object. For example, application 703 may, via software component interface proxy 704, send out a WIA API call such as CoCreateInstance( ) to retrieve a WiaDeviceManager object. In response to the signal, the service layer (e.g., WIA service layer) may create and return (e.g., return a pointer to) an instance of an image acquisition service object. The remote operating system may create an instance of native image acquisition service object 705A, which is native to and provided by the remote operating system, and return (e.g., return a pointer to) an instance of native image acquisition service object 705A to application 703 via software component interface proxy 704. Native image acquisition service object 705A may be, for example, a WiaDeviceManager object of the WIA API. After application 703 obtains (e.g., obtains a pointer to) native image acquisition service object 705A such as the image acquisition device manager object, application 703 may request subsequent interfaces (e.g., objects) through native image acquisition service object 705A or one of its derived objects.

In order to intercept and redirect signals (e.g., API calls) between applications 703 and the image acquisition service layer, a hook may be installed on the remote operating system to listen for calls from any of applications 703 to create and return an instance of an interface object (e.g., an image acquisition service object). The hook may be, for example, a dynamic link library (DLL) file of the WINDOWS operating system platform. Once the hook (e.g., WIAHook.dll) is installed in the remote operating system, it may listen for and intercept a call (e.g., CoCreateInstance( )) to create an instance of an object such as an image acquisition device manager object (e.g., WiaDeviceManager). The hook may compare an interface identifier (IID) included in the call with a known IID value of the image acquisition service (e.g., WiaDeviceManager). If the comparison yields a match, that is if the intercepted call from application 703 is for retrieving a specific object (e.g., WiaDeviceManager), then an instance of virtual image acquisition service object 705B (e.g., CtxWiaDevMgr developed by Citrix Systems, Inc. of Ft. Lauderdale, Fla.) may be returned to application 703 instead. If there is no match, the intercepted call may be forwarded to a native service control manager (e.g., Windows Service Control Manager) of the host operating system as if the interception had not taken place. Before returning the instance of virtual image acquisition service object 705B, the instance may need to be created first. The instance of virtual image acquisition service object 705B may be created before or after the call from application 703 is intercepted. For example, resources may be utilized more efficiently by creating the instance of virtual image acquisition service object 705B after the call from application 703 is intercepted. Alternatively, a pool of instances of virtual image acquisition service object 705B may be created ahead of time (e.g., before the call from application 703 is intercepted) to improve performance (e.g., interactivity).

After the hook intercepts the call from application 703 and returns the instance of virtual image acquisition service object 705B to application 703, application 703 may continue to interact with virtual image acquisition service object 705B as if application 703 had received native image acquisition service object 705A. Virtual image acquisition service object 705B may be considered "virtual" in a sense that it allows accessing one or more image acquisition devices 707 that are not physically present but are only virtually present for access on host side 702. Although virtual image acquisition service object 705B is not native image acquisition service object 705A, it mimics functionalities of native image acquisition service object 705A with respect to how it interacts with applications 703. For example, virtual image acquisition service object 705B may offer the identical interface (e.g., identical API calls, parameters, return values, etc.) to applications 703 as native image acquisition service object 705A would. However, when applications 703 sends subsequent signals (e.g., API calls) to retrieve subsequent interface objects of the image acquisition service, virtual image acquisition service object 705B may create and/or return other virtual counterparts to any native image acquisition service objects. The virtual image acquisition service objects may be implemented, for example, as an in-process COM server (e.g., WIARedirection.dll developed by Citrix Systems, Inc. of Ft. Lauderdale, Fla.). The virtual COM server may be responsible for intercepting calls, creating virtual objects, and returning objects and/or data back to applications 703 in the same way that applications 703 would expect from counterpart native image acquisition service objects. In an example embodiment, after the hook returns virtual image acquisition service object 705B (e.g., CtxWiaDevMgr) to application 703, application 703 may interact with virtual image acquisition service object 705B to perform various tasks including, for example, sending a signal (e.g., EnumDeviceInfo API call) to virtual image acquisition service object 705B for enumerating any image acquisition devices (e.g., WIA devices).

Virtual image acquisition service object 705B may receive the signal and then redirect the signal over the network via virtual channel 706 (e.g., a WIA HDX/ICA virtual channel developed by Citrix Systems, Inc. of Ft. Lauderdale, Fla.) to client side 701. In some embodiments, virtual channel 706 may be a presentation protocol layer channel tunneled within a reliable transport connection between client agent software 708 at client side 701 and a virtual desktop or a virtual app session of a remote operating system hosted on host side 702 (e.g. hosted on a virtualization server 403 as illustrated in FIG. 4). Virtual channel 706 protocol may allow for the bi-directional exchange of generalized packet data between client agent software 708 and virtual image acquisition service object 705B. Virtual channel 706 may be one of many virtual channels serving different purposes and either sharing the same transport connection or using different transport connections. In some embodiments, virtual channel 706 may use an unreliable (lossy) transport connection or a combination of reliable and lossy transport connections for at least a portion of the virtual channel protocol. In some embodiments, virtual channel 706 may be a communication tunnel such as a VPN tunnel. The signal may be replayed on client side 701 and data may be returned from client side 701 back to virtual image acquisition service object 705B via virtual channel 706. For example, the EnumDeviceInfo API call may ask for returning a new interface object called IEnumWIA_DEV_INFO. Thus, client side 701 may return its virtual equivalent object called CtxEnumWIA_DEV_INFO to virtual image acquisition service object 705B. Subsequently, application 703 may receive the CtxEnumWIA_DEV_INFO object and continue to use CtxWiaDevMgr object and/or CtxEnumWIA_DEV_INFO object. This pattern may continue and applications 703 may request objects to perform various actions on image acquisition devices 707A, 707B, 707C, 707D (collectively 707), and each time receive back a virtual version of the object that mimics or impersonates its native counterpart object. Applications 703 may thus use image acquisition devices 707 as if image acquisition devices 707 were directly connected to host side 702.

On client side 701, client agent software 708 may be running on a local operating system. Client agent software 708 may be similar to, for example, client agent software 504 of FIG. 5. Client agent software 708 may be, for example, CITRIX WORKSPACE application developed by Citrix Systems, Inc. of Ft. Lauderdale, Fla. Client agent software 708 may host image acquisition service proxy 709 in the local operating system. Image acquisition service proxy 709 may be, for example, a virtual driver for WIA redirection (e.g., vdwia.dll developed by Citrix Systems, Inc. of Ft. Lauderdale, Fla.). Image acquisition service proxy 709 may receive remoted software component interface (e.g., COM) calls from host side 702 and communicate with the image acquisition service (e.g., WIA service) on client side 701. Image acquisition service proxy 709 may be responsible for calling the functions (e.g., API calls) locally that were intercepted from host side 702 and sending any appropriate response back over the network to host side 702. For example, image acquisition service proxy 709 (e.g., a virtual driver) may replay the API call intercepted on host side 702 by sending one or more signals to image acquisition device 707 via native image acquisition service object 710, user mode device driver 711 (e.g., a vendor user mode device minidriver), and/or one or more kernel mode drivers 712A, 712B, 712C, 712D (collectively 712) in the local operating system. The local operating system (e.g., the client operating system) and the remote operating system (e.g., the host operating system) may be different from each other and the API call may require translation between the two disparate operating systems and/or APIs. For example, a WIA API call from a Windows application running on the host device may be redirected to a photo library of the client device that runs an iOS operating system, and photos previously obtained using the iOS device's camera and stored therein may be retrieved by the Windows application. The WIA API call may be translated into one or more corresponding iOS API calls for accessing the photo library.

The response may be data such as an acquired image and other data (e.g., an enumerated list of image acquisition devices 707, device statuses, device properties, etc.). In addition, image acquisition service proxy 709 may register for device events with the image acquisition service (e.g., WIA service) of the local operating system. Such registration may be performed by utilizing the image acquisition service API (e.g., WIA API) and passing an event globally unique identifier (GUID) and device ID to the image acquisition service to request for notifications to image acquisition service proxy 709, of events related to one or more image acquisition devices 707 should they occur. For example, image acquisition service proxy 709 may register for image acquisition device insertion, removal, button presses, and the like, and may be notified upon the occurrence of registered events. Once notified, image acquisition service proxy 709 and/or client agent software 708 may propagate the events back to host side 702 or take local action, such as launching a published application through a self-service plugin (SSP).

Thus, overall, service layer interception and redirection model 700 may allow full seamless end-to-end functionality between applications 703 and image acquisition devices 707 as if they reside on the same local system. Such method may outperform an interface-level (e.g., USB) interception/redirection method by requiring less network traffic between client side 701 and host side 702 and thus offering faster transfer speeds (e.g., throughput) of data. Specifically, intercepting and redirection at the service layer may not involve as many functional transactions as doing so at the interface level. Thus, a greater click-to-photon time, that is the time difference between a user input event (e.g., keyboard, mouse, touch, button press) and the corresponding graphics update generated by the hosted image application and delivered at the client agent software, may be achieved. For example, banking and medical facilities may be able to utilize remote scanning of financial documents and medical records more effectively with lower latency. Moreover, interception and redirection at the service layer may also provide a better user experience because image acquisition devices 707 can appear to the user just like a local device. The service layer interception redirection also may be more reliable than the interface-level interception and redirection because a potential error may result in a user mode crash instead of a kernel mode crash that can cause a system-wide fatal error (e.g., a blue screen error on WINDOWS).

Upon establishment of virtual channel 706 between client side 701 and host side 702, device properties of image acquisition devices 707, such as a list of connected devices, may be fetched and then cached on host side 702 (e.g., by the remote operating system) such that all subsequent reads may be served from the local cache, not requiring any network traffic between client side 701 and host side 702. For example, when application 703 sends an EnumDeviceInfo API call to virtual image acquisition service object 705B, virtual image acquisition service object 705B may redirect the call to client side 701 as described above, and when a response (e.g., a list of devices) is received from client side 701, the response may be stored in the local cache (e.g., by virtual image acquisition service object 705B). Subsequently, when application 703 sends another EnumDeviceInfo API call, virtual image acquisition service object 705B may serve the response (e.g., a list of devices) stored in the local cache instead of redirecting the call to client side 701 and receiving another response. Any updates to the values that occur on client side 701 may be propagated to host side 702 such that the local cache may be updated accordingly. The cached device list and/or properties may also be updated as a result of device events that client agent software 708 (e.g., CITRIX WORKSPACE) has registered for with the local image acquisition service (e.g., a WIA service) on the local operating system of the client computing device.

Published applications may contain properties indicating their compatibility with image acquisition devices (e.g., WIA devices). Client agent software 708 may dynamically (e.g., without user intervention) hook and replace association of button presses on image acquisition device 707 (e.g., a WIA scanner) with client agent software 708 via a self-service plugin (SSP). Alternatively, the association between the button press and client agent software 708 may be manually established by the user. For example, when a user presses the "scan" button on their WIA scanner, a published application that can perform the scan may be launched on the remote operating system as opposed to a local application on the local operating system. In order to accomplish this, client agent software 708 may associate itself with one or more image acquisition devices 707 such that when a physical button (e.g., a hardware button such as "Scan," "Copy," "OCR" (optical character recognition), etc,) on image acquisition device 707 is pressed, client agent software 708 may receive or intercept the corresponding signal and send a call (e.g., a signal, a request, a command, etc.) to host side 702 (e.g., virtual image acquisition service object 705B) via virtual channel 706 to launch one or more scanning applications 703A.

In order to support multi-threaded applications consuming the image acquisition service (e.g., WIA) API, the IMarshal interface may be implemented. Application 703 may receive a virtual object interface on thread 1 and then expect to be able to marshal it into a stream for use on thread 2. Each virtual object may implement functions to wrap the object inside of a generic IStream pointer and unpack the object from a generic IStream pointer as well. The communication from application 703 to image acquisition device 707 may happen with COM hooking on host side 702. However, another form of communication may take place from image acquisition device 707 to the local operating system and examples of this may include plugging a device in, device removal, button presses on the device, and the like. In order to intercept these events, the image acquisition service proxy 709 may register with the local image acquisition service (e.g., WIA) for the relevant event GUIDs and be notified. These events may be propagated to host side 702 where the local cache may be updated. In addition, these events may trigger the launch of published applications as described above.

If the client is performing a function such as "scan to PDF" or "scan to image," intercepting and redirecting API calls and/or data can be bypassed, and instead the image data may be stored directly on client side 701 using client drive mapping in conjunction with image acquisition service proxy 709 (e.g., proxy DLL). For example, image acquisition device 707 may have a dedicated hardware button that allows a user to save an image as a Portable Document Format (PDF) file, a Joint Photographic Experts Group (JPEG) file, or any other image format file. Alternatively or additionally, scanning application 703 may have functionality to achieve the same result. When these commands are invoked (e.g., pressing a hardware button on image acquisition device 707 or selecting a menu item on scanning application 703), the user may be asked (e.g., provided with a dialog box) whether the image data is to be stored directly to the file system of the local operating system on client side 701. Alternatively, a user preference for such commands may be stored in advance and the user may not be asked every time a command is issued. If the user chooses to store the image data directly to the file system or a previously stored user preference dictates that this is the preferred method of handling such a command, the image data acquired by image acquisition device 707 may propagate through USB driver 712, user mode device driver 711, native image acquisition service object, and/or image acquisition service proxy 709, and then instead of being rerouted to host side 702 through virtual channel 706, the image data may be stored directly into the file system of the local operating system on client side 701. For example, a file name and/or folder path on a client drive (e.g., a hard disk drive, a solid-state drive (SSD), a USB drive, a logical drive, etc.) of the client drive may be mapped in advance to image acquisition device 707 and/or scanning application 703 such that when a command (e.g., scan to PDF) is received, the image data may be saved directly to the mapped drive and/or path. Alternatively, the user may be prompted to select a drive and/or folder path every time the command is received. Saving the image data in the local file system may be performed by client software 708, image acquisition service proxy 709, native image acquisition service object 710, and/or a separate entity in the local operating system.

Service layer interception and redirection model 700 may have multi-platform support. For example, the remote operating system on host side 702 may be WINDOWS while the local operating system on client side 701 may be a non-WINDOWS endpoint device platform (e.g., MACOS, LINUX, UNIX, iOS, ANDROID, etc.). In such a case, translation may be performed between native OS APIs and image storage/format representations of the local operating system to the WIA API of the remote operating system (e.g., WINDOWS). For example, client agent software 708 written for iOS may ask the user for permission to access the user's photo library to translate the images obtained using the iOS device camera to a WIA data stream over virtual channel 706 (e.g., an HDX/ICA virtual channel).

Figure 8:
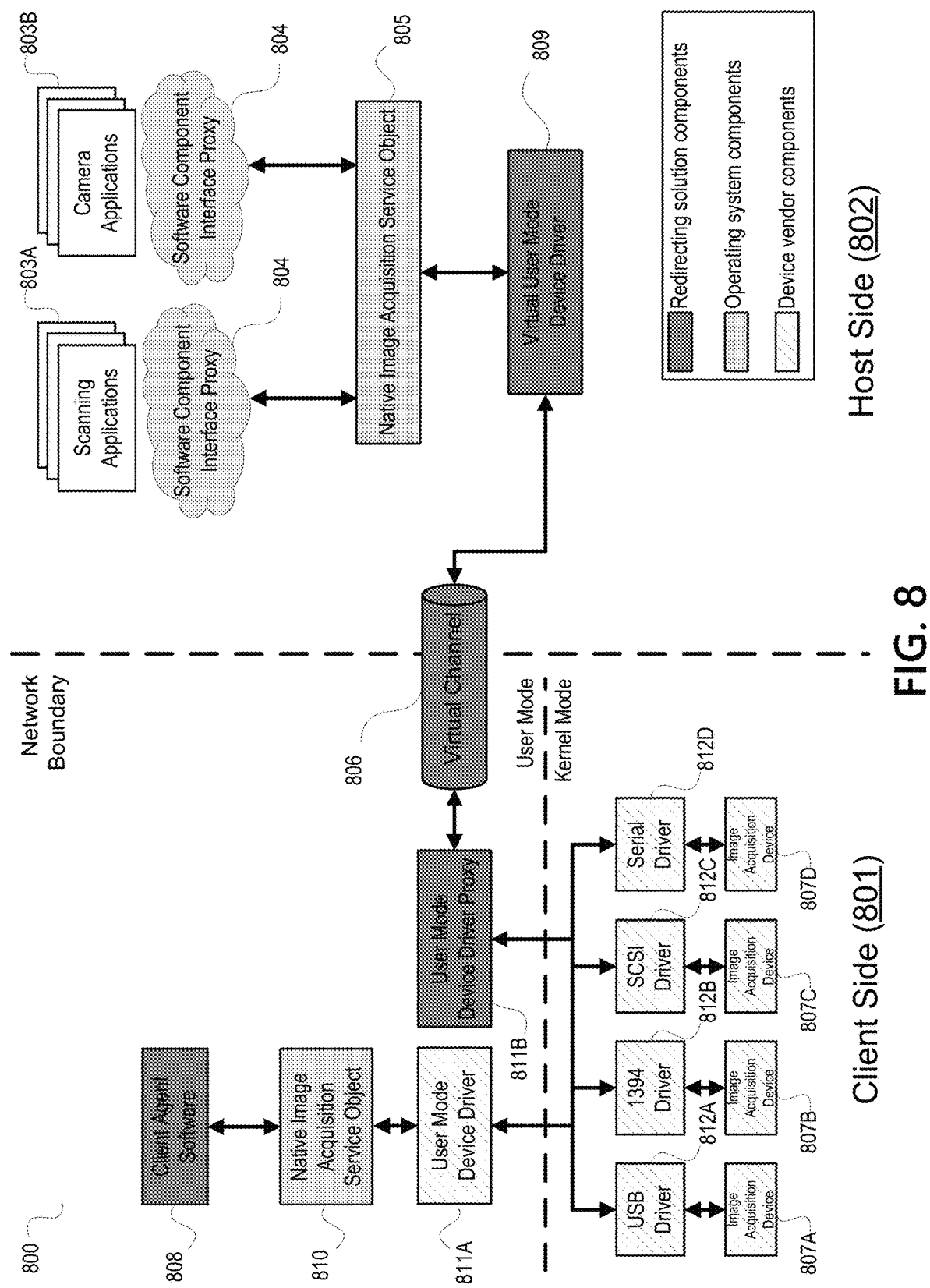
FIG. 8 depicts an illustrative image acquisition interception and redirection model at a device driver level.

Alternative to the image acquisition interception and redirection model at the service layer, FIG. 8 depicts an illustrative image acquisition interception and redirection model at a device driver level. Illustrative device driver interception and redirection model 800 may be similar to virtual user mode driver interception/redirection 611 illustrated above with reference to FIG. 6. The components illustrated in FIG. 8 may be substantially similar to the respective corresponding components illustrated in FIGS. 6 and 7 unless noted otherwise. Instead of hooking at the service layer of the remote operating system, device driver interception and redirection model 800 adds virtual user mode vendor driver 809 at the user mode device driver level of the remote operating system. Virtual user mode device driver 809 may be considered "virtual" in a sense that it allows managing and operating one or more image acquisition devices 807 that are not physically present but only virtually present for access on host side 802.

Virtual user mode device driver 809 may receive signals that it received from applications 803 via software component interface (e.g., COM) proxy 804 and native image acquisition service object 805 of the remote operating system and redirect the signals to user mode device driver proxy 811B on client side 801 via virtual channel 806 (e.g., a WIA virtual channel). User mode device driver proxy 811B may be a user mode device driver that mimics or impersonates functionalities of a user mode device driver with respect to how it interacts with kernel mode drivers 812A, 812B, 812C, 812D (collectively 812). User mode device driver proxy 811B may replay the signals that it received from host side 802 by controlling one or more image acquisition devices 807 via one or more kernel mode drivers 812. User mode device driver proxy 811B may also receive a response (e.g., data) from the one or more image acquisition device 807 via the kernel mode device drivers 812 and redirect the response to virtual user mode device driver 809 via virtual channel 806.

Device driver interception and redirection model 800 may also allow full seamless end-to-end functionality between applications 803 and image acquisition devices 807 as if they reside on the same local system. Such a method may outperform an interface-level (e.g., USB) interception/redirection method by requiring less network traffic between client side 801 and host side 802 and thus offering faster transfer speeds (e.g., throughput) of data. Moreover, interception and redirecting at the service layer may also provide a better user experience because image acquisition devices 807 can appear to the user just like a local device. The service layer interception redirection also may be more reliable than the interface-level interception and redirection because a potential error may result in a user mode crash instead of a kernel mode crash that can cause a system-wide fatal error (e.g., a blue screen error on WINDOWS).

The various interception and redirection models heretofore described in terms of calls to an image acquisition service of the operating system. However, these models may be adjusted and applied to other types of services of the operating system other than the image acquisition service. By redirecting calls at the service level, the amount of network traffic could be reduced than it would have been with an interception point at the interface (e.g., USB) level.

Figure 9:
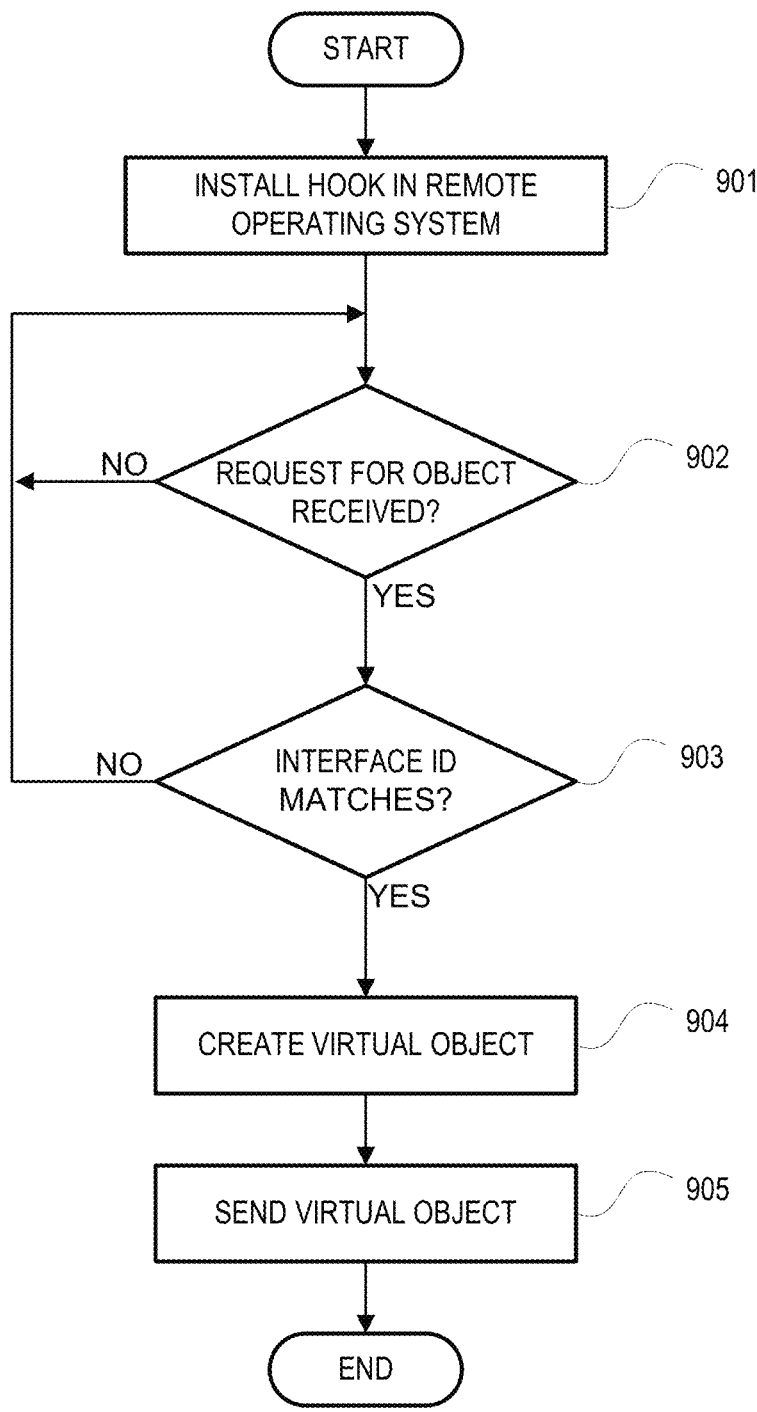
FIG. 9 depicts an illustrative method for installing a hook for creating a virtual object.
Figure 10:
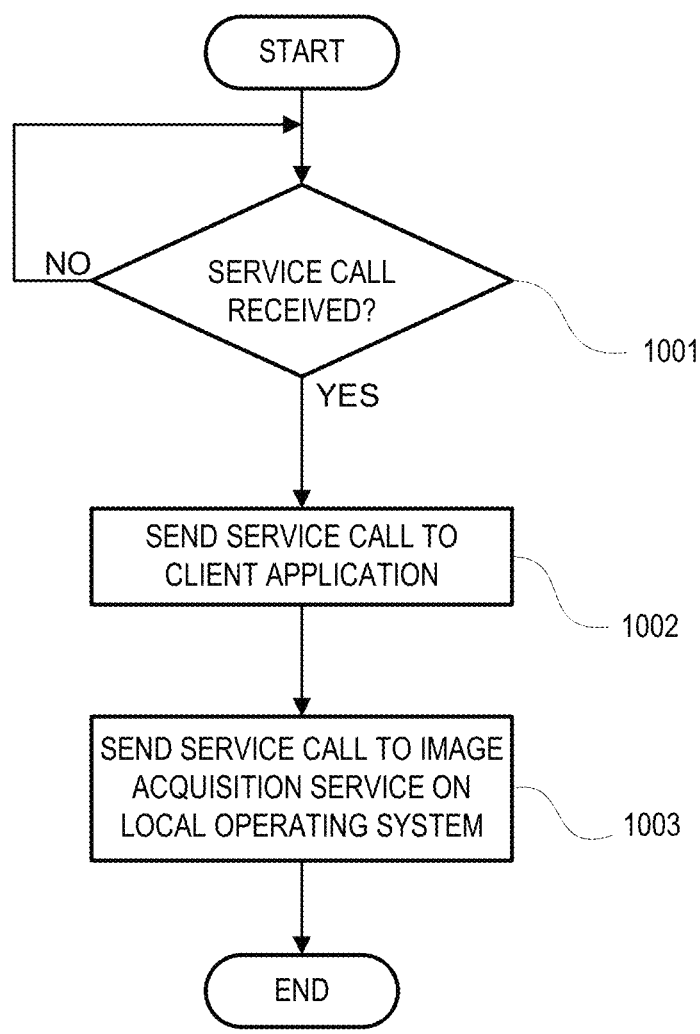
FIG. 10 depicts an illustrative method for intercepting a service call using a virtual object.
Figure 11:
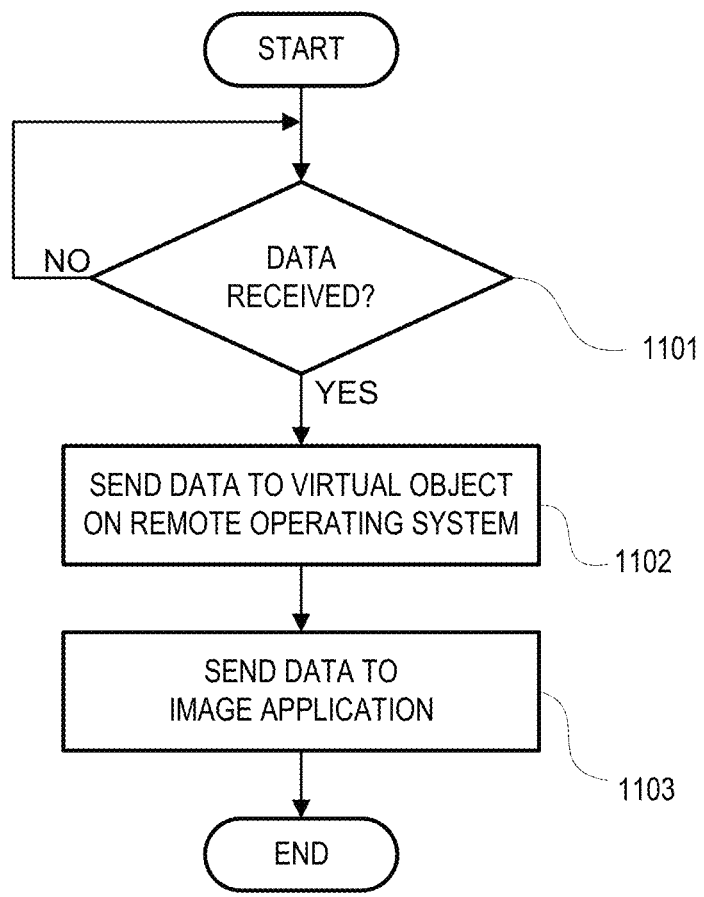
FIG. 11 depicts an illustrative method for redirecting data from an image acquisition device of a client computing device to an image application running on a host computing device.

Having disclosed some system components, concepts, and architectures, FIGS. 9-11 illustrate methods or algorithms that may be performed to implement various features described herein. These methods or algorithms may be performed by one or more devices illustrated in FIGS. 1-8. The steps outlined herein are illustrative and can be implemented in any combination thereof, including combinations that exclude, add, or modify certain steps.

FIG. 9 depicts an illustrative method for installing a hook for creating a virtual object. In step 901, a hook may be installed in a remote operating system. The hook may intercept a request, sent by the image application, for an instance of an image acquisition service layer object. The hook may be a DLL file (e.g., WIAHook.dll developed by Citrix Systems, Inc. of Ft. Lauderdale, Fla.) that is configured to listen for and intercept an API call from an image application and/or its software component interface proxy (e.g., COM proxy). If the hook receives (e.g., intercepts) a request for an object (902: YES), the process may proceed to step 903. The request may be an API call such as CoCreateInstance( ) on the WINDOWS platform for creating an instance of an object. The request may include a requested interface identifier (e.g., IID). In step 903, the hook may observe the interface ID that is included in the request and compare it to a known interface ID the hook is listening in for. The known interface ID may be an interface ID of a specific image acquisition service layer object of the remote operating system. For example, the hook may determine whether the IID included in the CoCreateInstance( ) call is for a WiaDeviceManager object. If a match is found (903: YES), then the process may proceed to step 904. If no request is received (902: NO) or if the request is for a wrong interface ID (903: NO), then the process may return to step 902 and the hook may continue to monitor for incoming API calls from the image application.

In step 904, the hook may create a virtual object. The virtual object may be created at an image acquisition service layer of a remote operating system associated with a host computing device. The virtual object may mimic functionality of an image acquisition service layer object that is native to the remote operating system. The virtual object may be a COM object. The virtual object may be a virtual WIA service object such as a CtxWiaDevMgr object that mimics or impersonates the functionalities of a native WIA service object such as a WiaDeviceManager object. In step 905, the virtual object may be sent back to the image application. The hook may send an indication (e.g., a pointer) of the object to the image application.

FIG. 10 depicts an illustrative method for intercepting a service call using a virtual object. In step 1001, a virtual object may determine whether a service call has been received. The virtual object may be a virtual image acquisition service object such as a virtual WIA device manager object (e.g., CtxWiaDevMgr). The service call may be an API call such as a WIA API call from an image application running on a remote operating system. The service call may be received from the image application via a software component interface (e.g., COM) proxy. The service call may include a request for enumerating one or more devices (e.g., image acquisition devices) associated with (e.g., physically connected to) a client computing device, reading and/or writing a device property associated with the one or more devices, acquiring image data via the one or more image devices, and/or transferring the image data. The one or more devices (e.g., image acquisition devices) may include a scanner, a camera, a fax machine, an imaging device, a memory card reader, and/or a storage medium. If a service call is received (1001: YES), the process may proceed to step 1002. Otherwise (1001: NO), the virtual object may continue to monitor for a service call in step 1001.

The virtual object may receive a service call from an image application executing on the remote operating system. In step 1002, the virtual object may redirect the service call to a local operating system on a client computing device by sending the service call to a client application, such as client agent software 708 of FIG. 7, running on the local operating system. A virtual channel between the object and the client application may be established over a network. The service call may be sent to the client application via the virtual channel. The client computing device may access the remote operating system via the client application using a display remoting protocol such as the HDX/ICA protocol. The client application may be configured to replay the received service call in the local operating system of the client computing device. In step 1003, the client application may send the service call to an image acquisition service on the local operating system. In step 1003, the client application may send the service call to an image acquisition service of the local operating system. The image acquisition service of the local operating system may control (e.g., via user mode and/or kernel mode device drivers) image acquisition devices associated with the client computing device according to the service call. The devices may include a scanner, a camera, a fax machine, an imaging device, a memory card reader, and/or a storage medium.

FIG. 11 depicts an illustrative method for redirecting data from an image acquisition device of a client computing device to an image application running on a host computing device. In step 1101, a client application running on a local operating system of a client computing device may determine whether data has been received. The data may be sent by an image acquisition device connected to the client computing device. The data may be received by the client application via a kernel mode device driver, a user mode device driver, an image acquisition service object, and/or an image acquisition service proxy. The data may be a request or command sent by the image acquisition device. The data may be a response to a service call from an image application. The data may be image data acquired by the image acquisition device. If the client application receives the data (1101: YES), then the process may proceed to step 1102. If no data is received (1101: NO), then the client application may continue to monitor for data.

In step 1102, the client application may send the data to a virtual object on a remote operating system. The data may be sent via a virtual channel established between the local operating system and the remote operating system. The virtual object may be a virtual image acquisition service object (e.g., a WIA object). The remote operating system may be running on a host computing device (e.g., a virtualization server). The virtual object may receive the data from the client application in response to the service call received from the image application. The virtual object may store the data in a local cache of the host computing device. In step 1103, the virtual object may send the data to the image application. The object may receive a subsequent service call from the image application. In response to the subsequent service call, the object may send the data stored in the local cache to the image application rather than redirecting the subsequent service call to the client side and receiving new data. The object may receive a signal from the client application to launch the image application. The signal may have been triggered by an event (e.g., pressing of a physical button) on an image acquisition device that is associated with (e.g. connected to) the client device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
creating, at an image acquisition service layer of a remote operating system associated with a host computing device, an object that mimics functionality of an image acquisition service layer object that is native to the remote operating system;
receiving, by the object and from an image application running on the remote operating system, a service call;
sending, by the object and to a client application running on a local operating system of a client computing device, the service call;
receiving, by the object and in response to the service call, data from the client application;
storing the data in a local cache of the host computing device; and
sending, by the object and to the image application, the data.

2. The method of claim 1, wherein the object is a component object model (COM) object.

3. The method of claim 1, further comprising:
receiving, by the object and from the image application, a subsequent service call; and
in response to the subsequent service call, sending, by the object and to the image application, the data stored in the local cache.

4. The method of claim 1, wherein the object comprises a virtual device manager object, and wherein the image acquisition service layer object comprises a native device manager object of the host computing device.

5. The method of claim 1, further comprising:
installing, in the remote operating system, a hook;
intercepting, by the hook, a request, sent by the image application, for an instance of the image acquisition service layer object; and
sending, by the hook and to the image application, an indication of the object.

6. The method of claim 5, wherein the request comprises a requested interface identifier, and
wherein the intercepting the request comprises comparing the requested interface identifier with a known interface identifier of the image acquisition service layer object of the remote operating system.

7. The method of claim 1, wherein the service call comprises a request for at least one of:
enumerating one or more image acquisition devices associated with the client computing device,
reading or writing a device property associated with the one or more image acquisition devices,
acquiring image data via the one or more image acquisition devices, or
transferring the image data.

8. The method of claim 7, wherein the one or more image acquisition devices comprise at least one of a scanner, a camera, a fax machine, an imaging device, a memory card reader, image storage, a photo library, or a storage medium.

9. The method of claim 1, further comprising establishing, over a network, a virtual channel between the object and the client application,
wherein the sending the service call comprises sending the service call via the virtual channel.

10. The method of claim 1, wherein the client application is configured to replay the received service call in the local operating system of the client computing device.

11. The method of claim 1, further comprising: receiving, by the object and from the client application, a signal to launch the image application, wherein the signal is triggered by a button press on an image acquisition device associated with the client computing device.

12. The method of claim 1, wherein the remote operating system is different from the local operating system, and
wherein the sending the service call comprises:
translating the service call according into a translated service call that is compatible with the local operating system; and
sending the translated service call to the client application.

13. An apparatus comprising:
local cache memory;
one or more processors; and
memory storing instructions that, when executed by the one or more processors, cause the apparatus to:
create, at an image acquisition service layer of a remote operating system associated with the apparatus, an object that mimics a functionality of an image acquisition service layer object that is native to the remote operating system;
receive, by the object and from an image application running on the remote operating system, a service call;
send, by the object and to a client application running on a local operating system of a client computing device, the service call;
receive, by the object and in response to the service call, data from the client application;
store the data in the local cache memory; and
send, by the object and to the image application, the data.

14. The apparatus of claim 13, wherein the object is a component object model (COM) object.

15. The apparatus of claim 13, wherein the instructions, when executed by the one or more processors, cause the apparatus to:
   install, in the remote operating system, a hook;
   intercept, by the hook, a request, sent by the image application, for an instance of the image acquisition service layer object; and
   send, by the hook and to the image application, an indication of the object.

16. The apparatus of claim 13, wherein the service call comprises a request for at least one of:
   enumerating one or more image acquisition devices associated with the client computing device,
   reading or writing a device property associated with the one or more image acquisition devices,
   acquiring image data via the one or more image acquisition devices, or
   transferring the image data, and
   wherein the one or more image acquisition devices comprise at least one of a scanner, a camera, a fax machine, an imaging device, a memory card reader, or a storage medium.

17. A non-transitory computer-readable medium storing instructions that, when executed, cause a host computing device to:
   create, at an image acquisition service layer of a remote operating system associated with the host computing device, an object that mimics a functionality of an image acquisition service layer object that is native to the remote operating system;
   receive, by the object and from an image application running on the remote operating system, a service call;
   send, by the object and to a client application running on a local operating system of a client computing device, the service call;
   receive, by the object and in response to the service call, data from the client application;
   store the data in a local cache of the host computing device; and
   send, by the object and to the image application, the data.

18. The non-transitory computer-readable medium of claim 17, wherein the instructions, when executed, cause the host computing device to:
   install, in the remote operating system, a hook;
   intercept, by the hook, a request, sent by the image application, for an instance of the image acquisition service layer object; and
   send, by the hook and to the image application, an indication of the object.

19. The non-transitory computer-readable medium of claim 17, wherein the service call comprises a request for at least one of:
   enumerating one or more image acquisition devices associated with the client computing device,
   reading or writing a device property associated with the one or more image acquisition devices,
   acquiring image data via the one or more image acquisition devices, or
   transferring the image data.

20. The non-transitory computer-readable medium of claim 19, wherein the one or more image acquisition devices comprise at least one of a scanner, a camera, a fax machine, an imaging device, a memory card reader, or a storage medium.

* * * * *